United States Patent [19]

Stanesic et al.

[11] Patent Number: 5,522,634
[45] Date of Patent: Jun. 4, 1996

[54] VISOR ACCESSORY WITH SUN SHIELD INSERT AND RUNNING LIGHTS

[75] Inventors: John M. Stanesic, Johnston; Scott P. Thompson, Urbandale, both of Iowa

[73] Assignee: DFM Corporation, Urbandale, Iowa

[21] Appl. No.: 391,041

[22] Filed: Feb. 21, 1995

Related U.S. Application Data

[63] Continuation-in-part of Ser. No. 284,896, Aug. 2, 1994, Pat. No. 5,452,933.

[51] Int. Cl.⁶ .................................................. B60J 3/00
[52] U.S. Cl. ........................ 296/95.1; 362/80.1; 362/64
[58] Field of Search ................ 296/95.1; 160/DIG. 3, 160/370.21; 362/61, 80, 80.1, 83.3, 64

[56] References Cited

U.S. PATENT DOCUMENTS

| | | | |
|---|---|---|---|
| D. 154,735 | 8/1949 | Arbib | D14/6 |
| D. 155,030 | 8/1949 | Oswald | D14/6 |
| D. 273,672 | 5/1984 | Lund | D12/191 |
| D. 288,309 | 2/1987 | Lund | D12/191 |
| D. 288,310 | 2/1987 | Lund | D12/191 |
| D. 291,295 | 8/1987 | Lund | D12/191 |
| D. 301,028 | 5/1989 | Buck | D12/191 |
| D. 303,239 | 9/1989 | Gempel et al. | D12/191 |
| D. 303,948 | 10/1989 | Bonstead et al. | D12/191 |
| D. 312,238 | 11/1990 | Lund | D12/191 |
| D. 328,274 | 7/1992 | Lund | D12/181 |
| D. 329,630 | 9/1992 | Lund et al. | D12/181 |
| D. 330,003 | 10/1992 | Lund | D12/191 |
| 2,599,809 | 6/1952 | Branch | 296/95 |
| 2,681,700 | 6/1954 | Krusemark | 160/222 |
| 2,687,328 | 8/1954 | Dieterich | 296/95 |
| 3,424,490 | 1/1969 | Francis | 296/95 |
| 4,726,619 | 2/1988 | Haugestad | 296/95.1 |
| 4,842,320 | 6/1989 | Kingsley | 296/95.1 |
| 4,966,404 | 10/1990 | Lund | 296/95.1 |
| 5,108,142 | 4/1992 | Lund | 296/95.1 |
| 5,112,095 | 5/1992 | Lund et al. | 296/91 |
| 5,130,906 | 7/1992 | Lund | 362/80.1 |
| 5,184,866 | 2/1993 | Dresen et al. | 296/95.1 |

FOREIGN PATENT DOCUMENTS

| | | | |
|---|---|---|---|
| 487922 | 12/1952 | Canada . | |
| 781844 | 8/1957 | United Kingdom | 296/95.1 |
| 9107292 | 5/1991 | WIPO | 296/95.1 |

*Primary Examiner*—Joseph D. Pape
*Attorney, Agent, or Firm*—Zarley, McKee, Thomte, Voorhees, & Sease

[57] ABSTRACT

A windshield visor which has a visor frame, a plurality of running lights formed on the visor frame, a translucent insert which fits within the visor frame, bonding member positioned between the translucent insert and the visor frame, and which preferably has the translucent visor insert in conforming relationship to the visor frame structure, and fitting wholly over all fastening means. In a preferred embodiment, the visor frame is a multicomponent, hollow monocoque frame.

19 Claims, 5 Drawing Sheets

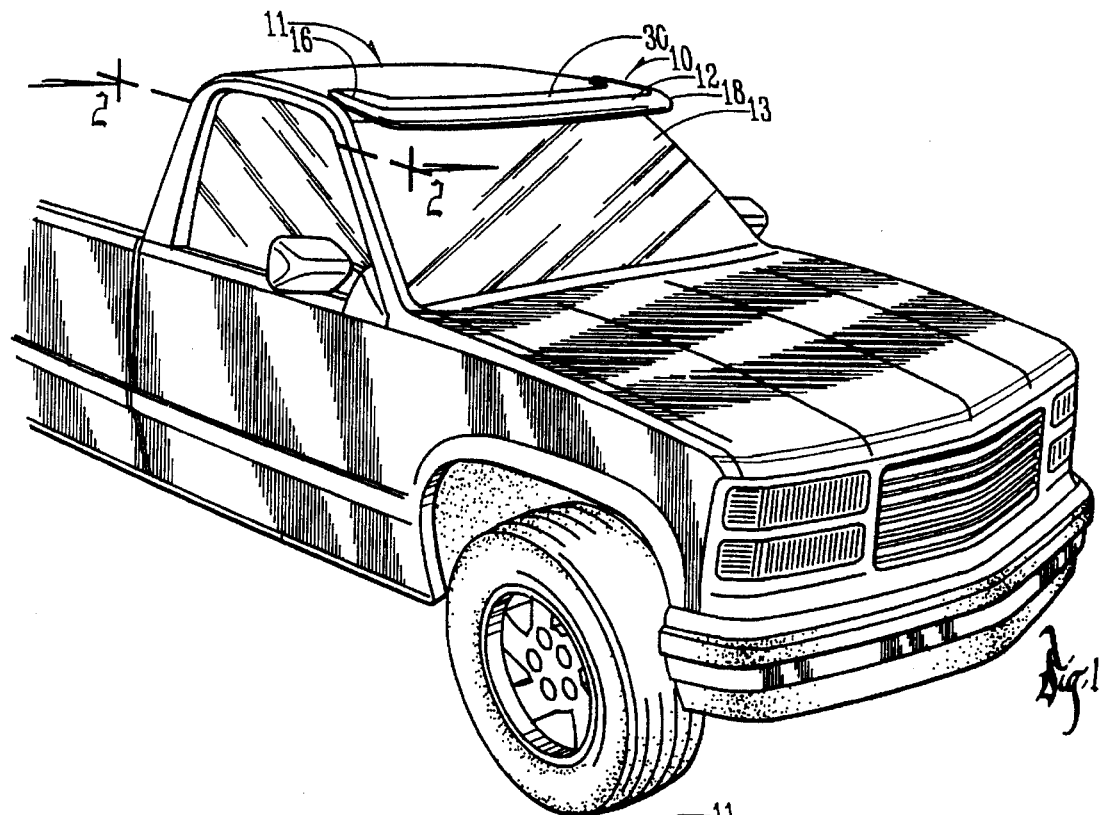
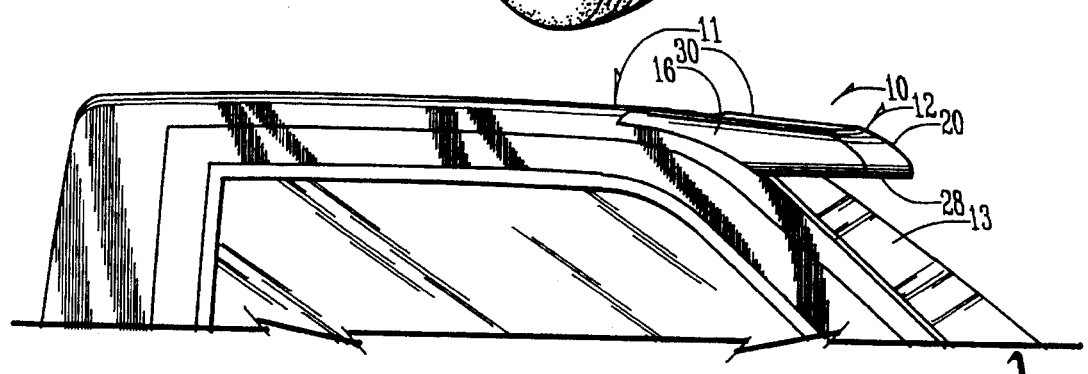
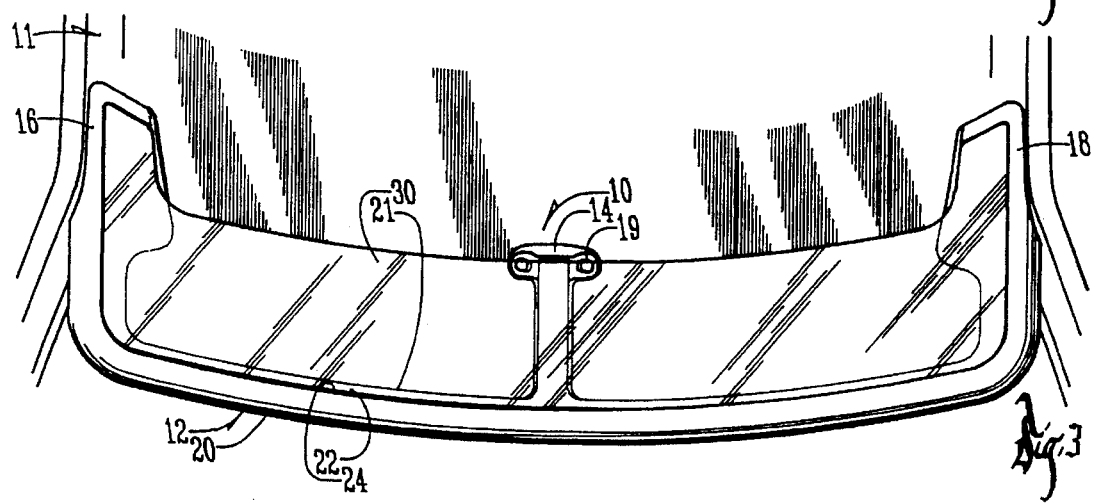

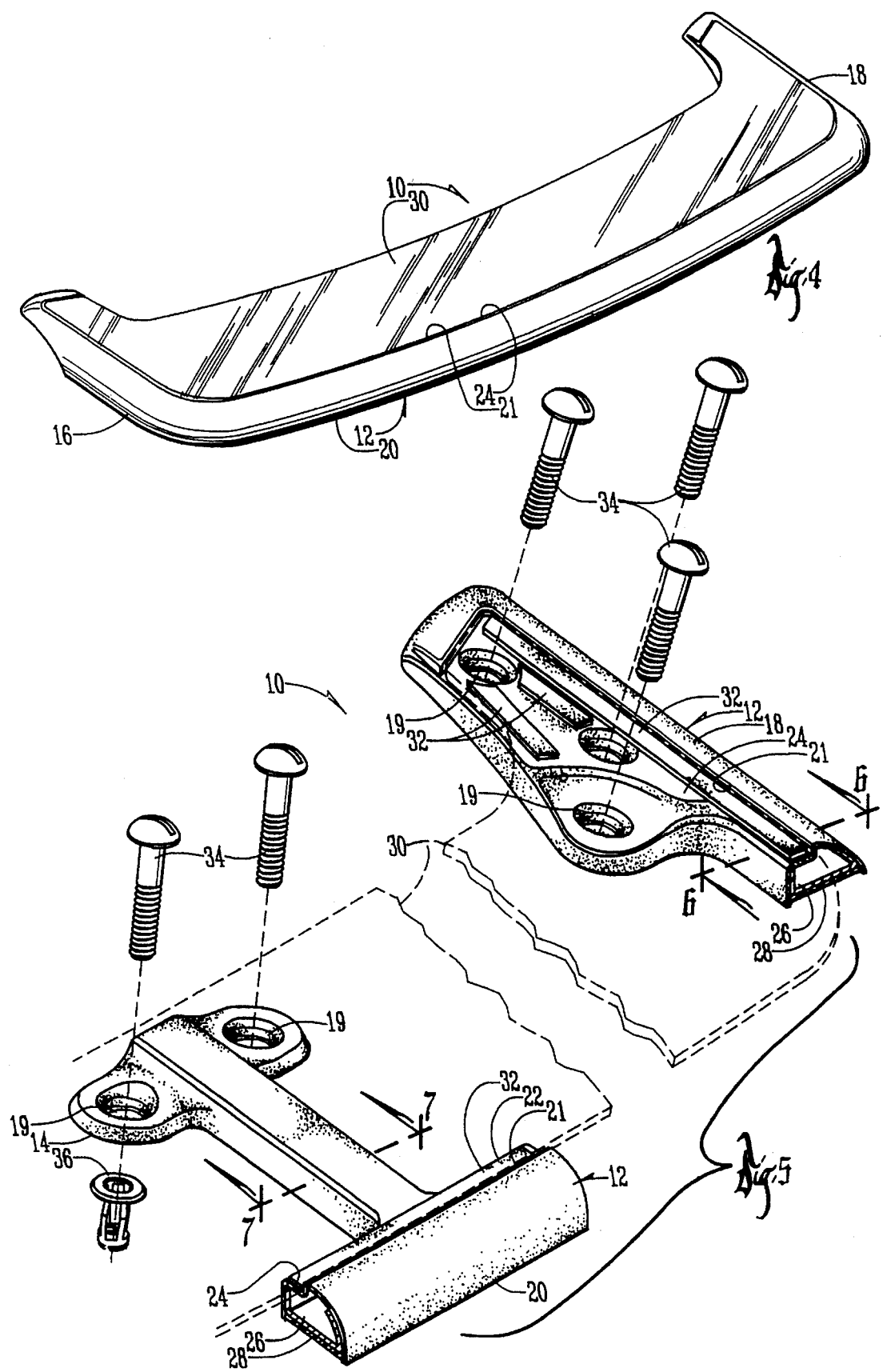

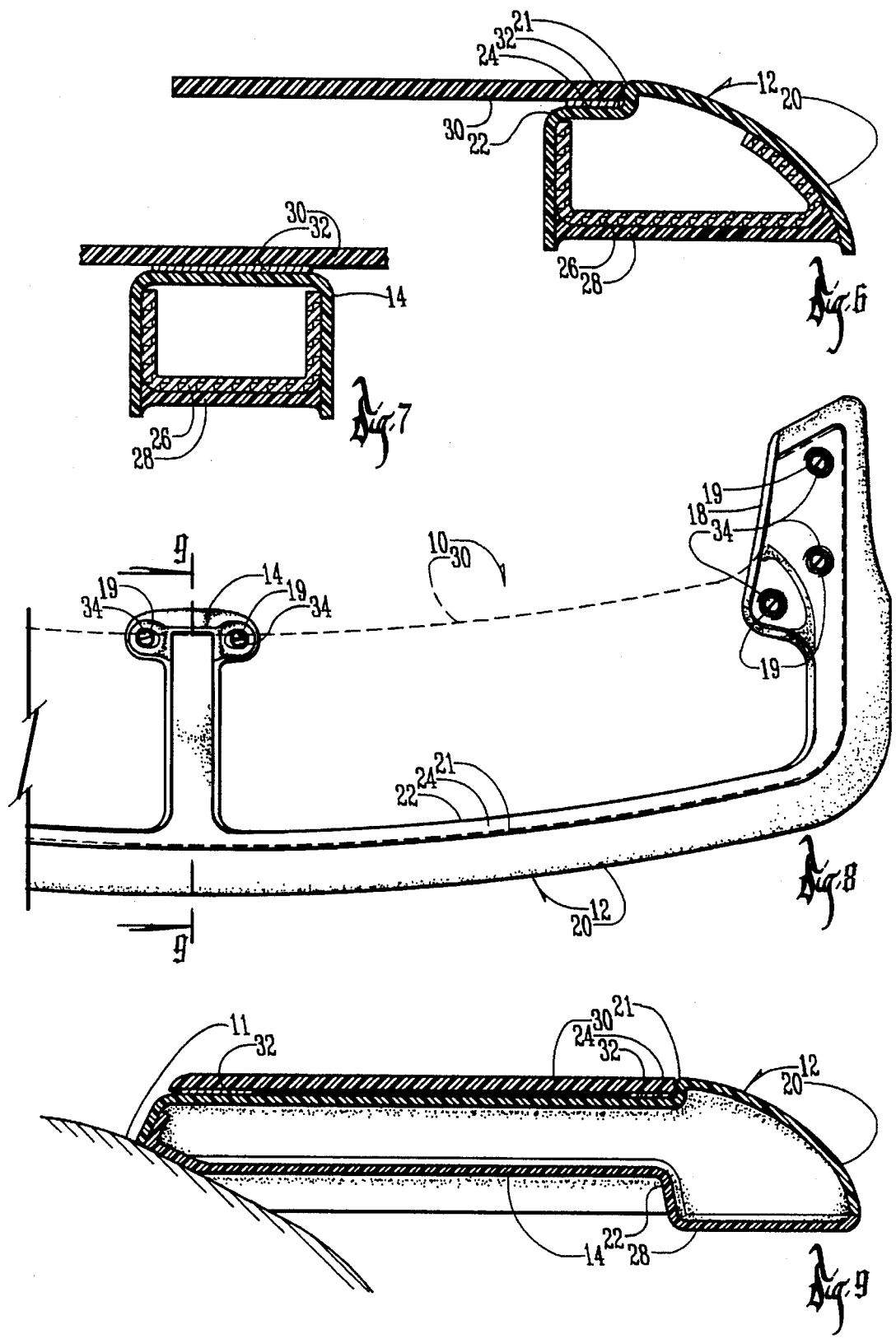

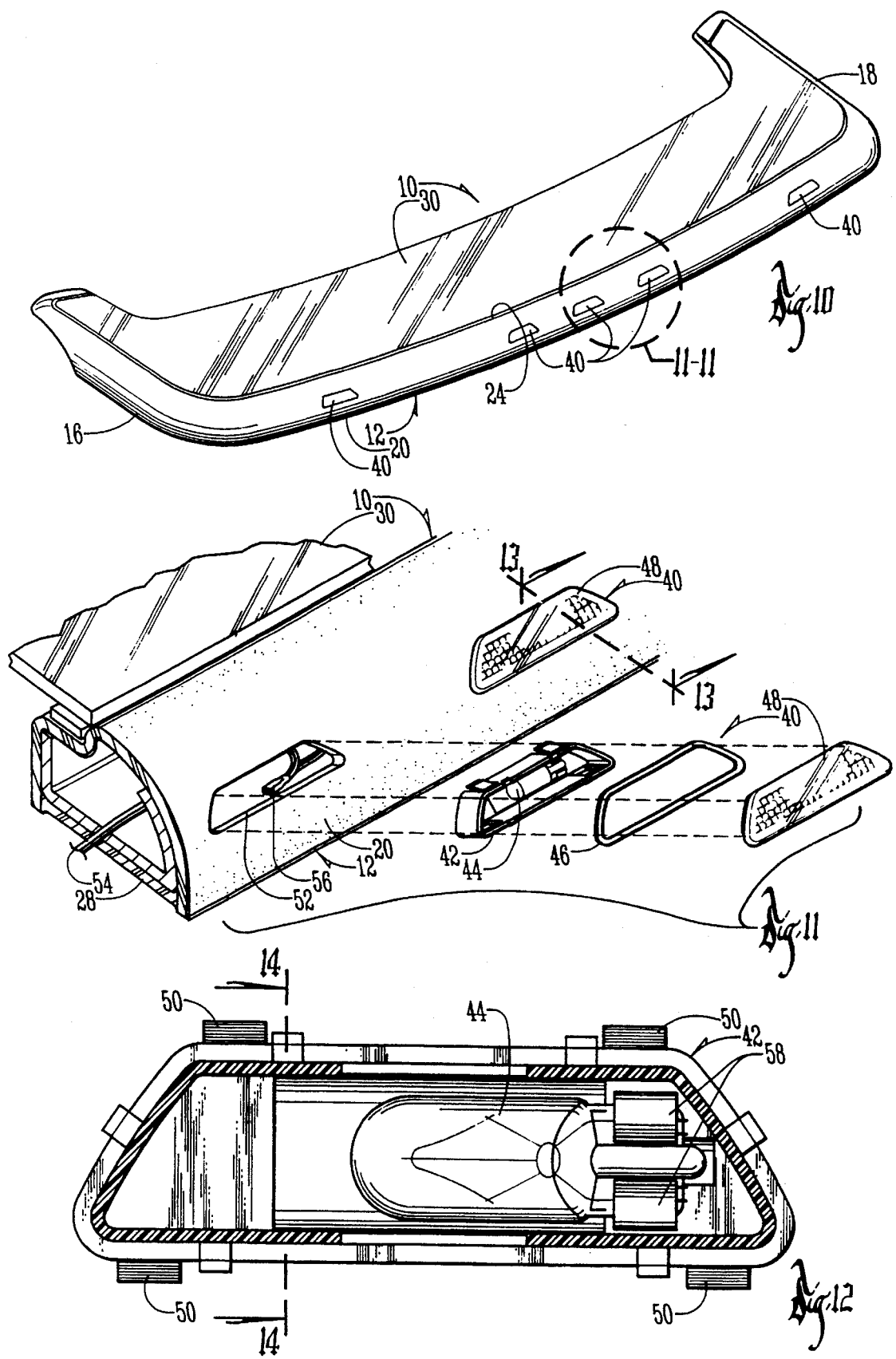

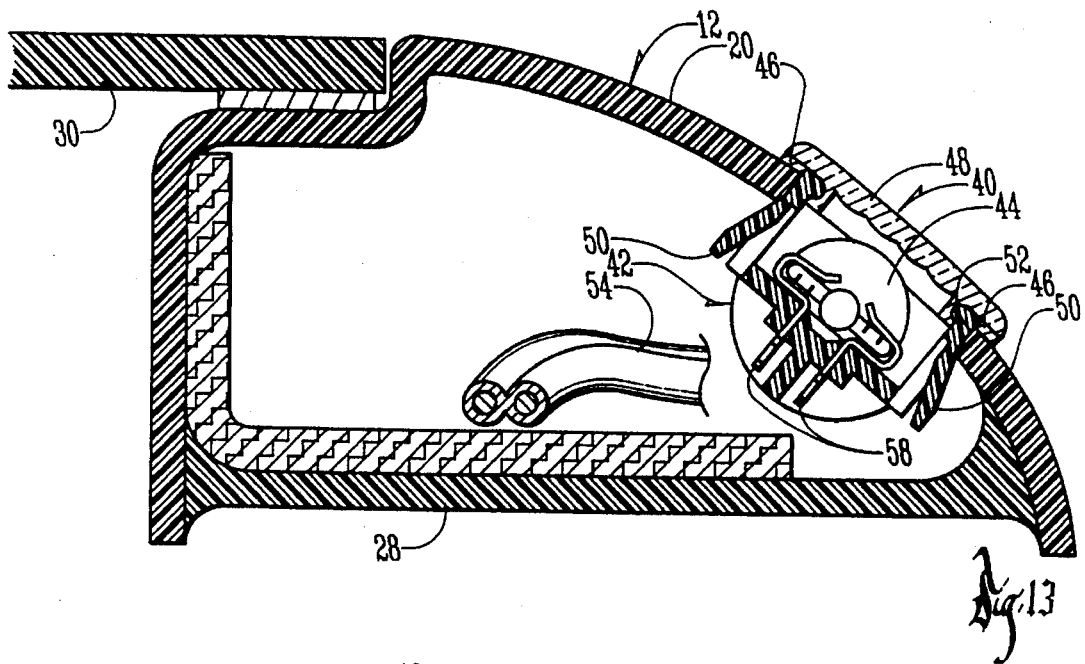
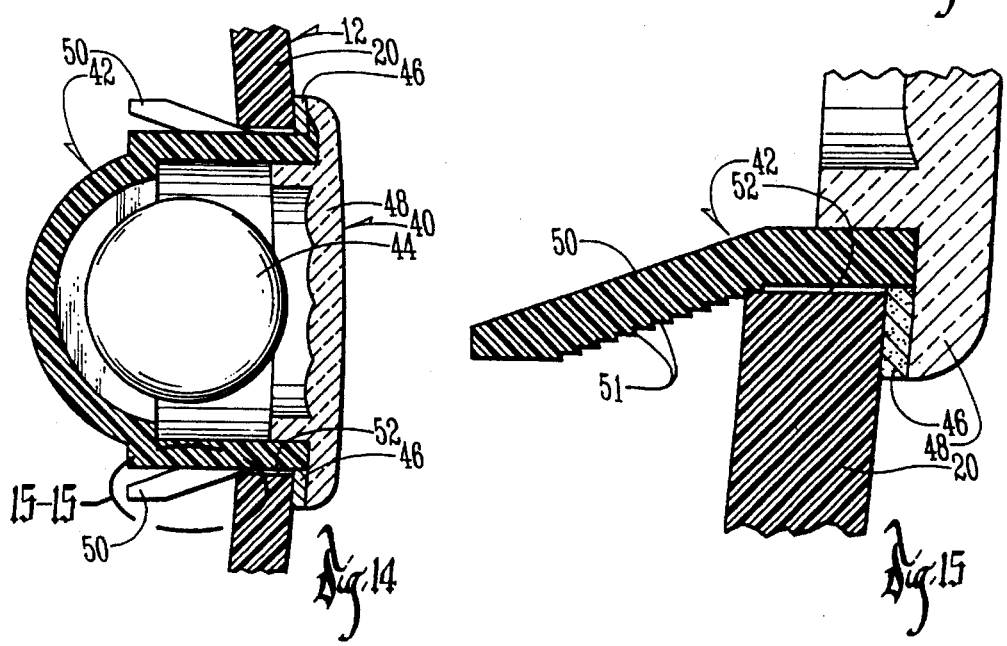
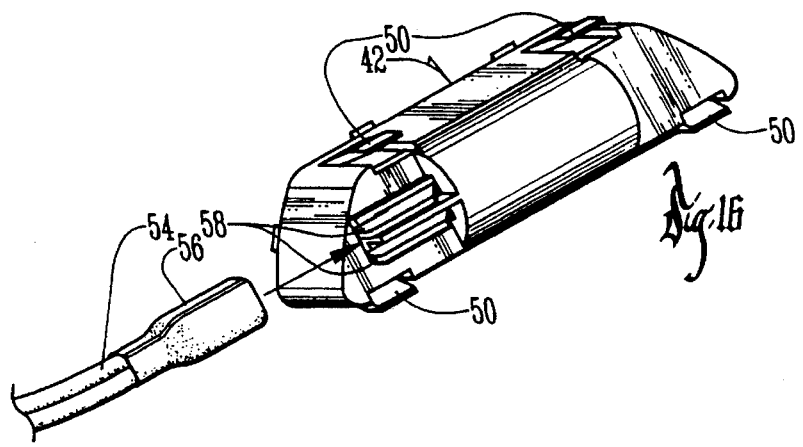

VISOR ACCESSORY WITH SUN SHIELD INSERT AND RUNNING LIGHTS

CROSS-REFERENCE TO RELATED APPLICATION

This is a continuation-in-part of application Ser. No. 08/284,896 filed on Aug. 2, 1994, now U.S. Pat. No. 4,452,933.

FIELD OF THE INVENTION

The present invention pertains to an exterior sun visor which is mountable to a vehicle above the vehicle's front windshield.

BACKGROUND OF THE INVENTION

Exterior sun visors that can optionally be mounted to vehicles are known. Such visors are currently sold in the vehicle accessory market. Increasingly, these are sold as plastic component kits attachable either by dealers or by the ultimate customer. These lightweight visors replace those that were sold perhaps 30–50 years ago as original option accessories with the vehicle.

While lightweight, attractive visors have their desirable features, they also have some inherent problems. First, because the visor is located on the forward portion of the vehicle just above the windshield, it necessarily is subject to extreme wind forces. As a result, if they are improperly constructed or improperly mounted, extreme vibration will occur. This extreme vibration is not only annoying to the vehicle driver, but also may eventually cause damage to both the visor and the vehicle cab, especially at the point of attachment of the visor to the cab.

Since one of the primary purposes of a visor is to shield the driver's eyes from sun, it necessarily follows that a desirable feature is the use of a translucent material on at least a portion of the visor so that it shields the driver's eyes in similar fashion that sun glasses do. This feature particularly involves the use of an additional type of material, different from that of the visor frame. While the shading for the driver's eyes is a nice feature, the use of two or more materials to form the visor composite compounds problems caused by high wind velocity, since the multicomponents sacrifice structural integrity. As a result, wind velocity may often damage, destroy or pull away a shaded visor insert.

One way that the prior art has solved the structural integrity problems is to utilize a visor which has a rigid interior steel frame, the theory being that this steel frame will make it more rigid to withstand the wind velocity to avoid vibration problems. However, this use of such a steel frame drastically increases cost, and the increased weight will exacerbate vibration damage, if and when the unit vibrates.

It can therefore be seen that there is a real and continuing need for the development of a lightweight, economical, easy-to-install visor.

The primary objective of the present invention is to develop the needed lightweight, economical, easy-to-install, and structurally strong visor.

Another objective of the present invention is to prepare a visor insert which, because of its streamlined and contoured shape, as well as its integrated structure, avoids normally attendant vibration problems.

Another objective of the present invention is to provide a windshield visor which can use a visor insert, but which avoids potential damage to the insert caused by wind velocity.

Another objective of the present invention is to provide a hollow interior visor frame, preferably of a multicomponent hollow monocoque frame. These and other objectives will become apparent from the detailed description of the invention which follows.

A yet further objective is to provide a visor which has no exposed edges, and the mating surface matches the contour of the vehicle in a flush manner.

Another objective of the present invention is to provide a windshield visor that has running lights formed on it.

BRIEF DESCRIPTION OF THE DRAWINGS

FIG. 1 is a perspective view of a vehicle with the windshield visor embodying the present invention attached.

FIG. 2 is a side elevational view of the vehicle along line 2—2.

FIG. 3 is a plan view of the visor.

FIG. 4 is a perspective view of the visor.

FIG. 5 is an exploded view showing how the visor components fit together for securement to the cab of a vehicle.

FIG. 6 is a sectional view along line 6—6 of FIG. 5.

FIG. 7 is a sectional view along line 7—7 of FIG. 5.

FIG. 8 is a plan view with parts broken away showing how the visor frame is attached to the vehicle.

FIG. 9 is a sectional view along line 9—9 of FIG. 8.

FIG. 10 is a perspective view of the visor including five running lights.

FIG. 11 is an exploded view taken from line 11—11 in FIG. 10 showing how the light fixtures fit together with the visor.

FIG. 12 is a plan view of a light fixture with the lens removed.

FIG. 13 is a sectional view along line 13—13 of FIG. 11.

FIG. 14 is a sectional view along line 14—14 of FIG. 12.

FIG. 15 is a sectional view along line 15—15 of FIG. 14.

FIG. 16 is a perspective view of the back of the light fixture showing how it plugs into the wiring.

SUMMARY OF THE INVENTION

The present invention pertains to a windshield visor that may be sold in a kit for the vehicle accessory market. It preferably is comprised of a multicomponent hollow monocoque frame which defines an upper insert area to which a translucent visor insert can matingly fit and be bonded thereto, preferably by a pressure sensitive adhesive bonding strip. A number of running lights can be formed in the visor. The entire unit is structurally strong, of integrated, streamlined shape, lightweight, and avoids vibration problems.

DETAILED DESCRIPTION OF THE INVENTION

With continuing reference to the drawings, the visor 10 may be mounted to a vehicle cab 11 as illustrated in FIG. 1. The visor 10 is comprised of a visor frame 12 having a first outer end 16 and a second outer end 18. Visor outer ends 16 and 18 have a series of apertures 19 for use in securement of the visor frame 12 to the vehicle cab 11.

Visor frame 12, in addition to first outer end 16 and second outer end 18, may have a midpoint brace 14, also having apertures 19. Midpoint brace 14 is optional. It may or may not be used, but when used provides additional strength.

Visor frame 12 has a forward or leading edge 20. Visor frame 12 extends rearwardly from forward edge 20 in both a rearward and upward manner as depicted to a rear edge 21, dropping downwardly to define a rear shoulder 22. The drop from rear edge 21 to rear shoulder 22 defines an insert area 24.

The windshield visor frame 12 is preferably a multicomponent hollow monocoque frame which is ideally comprised of a thermoset plastic reinforced with woven fiberglass, with the thermoset plastic preferably being either polyester or polyurethane. As best seen in FIGS. 6 and 7, monocoque frame has cardboard insert 26 formed and fit during the molding process. Placed over the insert 26 is the resinous bottom material 28. In this way, strength is substantially increased in a lightweight structure.

Insert area 24 is adapted so that it may matingly hold, in conforming relationship, a translucent visor insert 30. Visor insert 30 may be made of translucent acrylic or Lexan®. Any suitable translucent plastic material will work. Visor insert 30 is bonded to visor frame 10 adjacent the inner edges of the insert area close to rear shoulder 22. As illustrated, a cushioned adhesive strip 32 is laid adjacent rear shoulder 22, and the visor insert 30 pressed downwardly against the adhesive strip to securely hold it. Because visor insert 30 is of a conforming and mating relationship with the insert area 24, it does not destroy the overall streamlined contour defined by forward edge 20, and the rearwardly extending portion of the frame towards rear edge 21. In this way, wind is deflected up and over without the potential of ripping visor insert 32 away from visor frame 10.

Bolts 34 are, of course, inserted into apertures 19 and into the cab 11 of the vehicle, using expandable anchors 36. These are, of course, inserted and secured before the visor insert 30 is bonded to the visor frame. As can be seen best in FIGS. 6 and 7, the interior of the visor frame is hollow, and if desired, may be used, for example, for interior mounting of visor lights, etc. The unit is lightweight, and has all the advantages of previously used shaded visors without sacrificing structural integrity. It can also be used with a minimum of wind-caused vibration problems.

The visor frame 12 may have a number of snap-in running lights 40 formed on the frame as illustrated in FIG. 10. The running lights 40 are each comprised of a housing 42, a bulb 44, a PVC gasket 46 and a lens 48 as shown in FIG. 11. The running lights 40 are inserted in apertures 52 which are formed in the visor frame 12 of the present invention. Each running light 12 includes 4 securement tabs 50 as shown in FIGS. 11–16. The securement tabs 50 are preferably made from a resilient material and include a plurality of locking members 51 on one side (FIG. 15). The tabs 50 are normally biased outward from the housing 42. When each running light 40 is inserted through the aperture 52, the securement tabs 50 press against the aperture 52 and come into engagement with the inside surface of the visor frame 12 as shown in FIG. 15. The locking members 51 help to secure the light 40 in place. The securement tabs 50 prevent the light fixture 40 from coming out of the visor frame once it is inserted. When each running light 40 is inserted into the aperture 52, the gasket 46 is disposed between the visor frame 12 and the lens 48. This ensures a moisture proof seal.

A power supply wire 54 is provided inside the visor frame for providing power to the bulbs 44. As shown in FIG. 16, before the running lights are inserted in the aperture 52, a wiring plug 56 is connected to the light fixture contacts 58 to provide power to the bulb 44. After this connection is made, the running light assembly can be inserted through the aperture 52.

The bulbs 44 used with the present invention are preferably bulbs that can be snapped in or out as opposed to conventional socket type bulbs. These snap-in bulbs 44 have a lower profile, are simpler, and are less expensive than conventional socket bulbs. When the insertion of the running lights 40 is complete, there are no visible fasteners holding the light fixture in place. Also, the lights 40 have a low profile so that they can conform to the shape of the frame 20 (FIG. 13).

It can therefore be seen that the invention accomplishes at least all of its stated objectives.

What is claimed is:

1. A windshield visor for mounting to the front portion of a vehicle cab, comprising:

a visor having a frame, said frame being adapted for securement to the cab of a vehicle;

a plurality of apertures formed in the visor frame;

a light fixture assembly disposed in each of the apertures, said assembly including a housing and a lens, said housing having a perimeter being generally the same size and shape as the aperature, said lens being larger than said aperture such that said assembly can be inserted through the aperture until the lens is stopped by the frame; and securing means coupling each of the light fixtures to the frame, wherein said securing means are disposed inside the frame.

2. The windshield visor of claim 1 wherein the light fixture includes a snap-in bulb.

3. The windshield visor of claim 1 wherein the light fixture is a snap-in fixture.

4. The windshield visor of claim 1 wherein the visor includes a plurality of light fixtures.

5. The windshield visor of claim 1 wherein the securing means is comprised of a plurality of locking tabs.

6. The windshield visor of claim 1 wherein the light fixture has a low profile in relation to the frame.

7. The windshield visor of claim 1 wherein the frame is hollow.

8. The windshield visor of claim 7 further comprising a power supply wire disposed inside the frame and electrically connected to the light fixture.

9. A windshield visor for mounting to the front portion of a vehicle cab, comprising:

a visor being adapted for securement to the cab of a vehicle;

at least one snap-in light assembly, said assembly including a plurality of securement tabs biased outward from said assembly to secure said assembly to an aperature formed in the visor; and wherein the light substantially conforms to the contour of the visor.

10. The windshield visor of claim 9 further comprising a gasket disposed between the snap-in light and the visor.

11. The windshield visor of claim 9 further comprising a lens positioned over the snap-in light.

12. The windshield visor of claim 9 wherein the fasteners are not visible when the snap-in light is secured to the aperture.

13. The windshield visor of claim 9 wherein the visor includes a plurality of snap-in lights.

14. A windshield visor for mounting to the front portion of a vehicle cab, comprising:

a visor frame having outer ends adapted for securement to the sides of the vehicle adjacent the ends of the windshield;

said visor frame having a forward edge which extends rearwardly and upwardly to define a rear shoulder defining an insert area;

a translucent visor insert shaped to matingly fit within the insert area, the translucent visor insert having a forward edge;

bonding means positioned between at least a portion of the forward edge of the translucent visor insert and the visor frame;

means to secure the visor frame to the sides of the vehicle adjacent the ends of the vehicle windshield; and at least one running light positioned on the visor frame.

15. The windshield visor of claim 14 wherein the running light is inserted through an aperture formed in the forward portion of the visor frame.

16. The windshield visor of claim 14 wherein the running light utilizes a snap-in light bulb.

17. The windshield visor of claim 15 wherein the running light is secured to the visor frame by a plurality of securement tabs.

18. The windshield visor of claim 14 wherein the visor includes a plurality of running lights.

19. A method of installing lights in a windshield visor for mounting to the front portion of a vehicle cab, comprising the steps of:

providing a visor having a frame being adapted for securement to the cab of a vehicle, said frame being generally hollow;

forming a plurality of apertures in the visor frame;

providing a plurality of light fixture assemblies, each of said light fixture assemblies having a plurality securement tabs positioned around the perimeter of the assembly for securing said light fixture assembly to an aperture; and inserting one of said light fixture assemblies in each of said apertures in the visor frame from the outside of the visor frame until said securement tabs secure said light fixture assemblies to said apertures.

* * * * *